Nov. 27, 1928.
E. S. MIX
BELT FOR PERSONAL WEAR
Filed Sept. 16, 1927
1,693,093
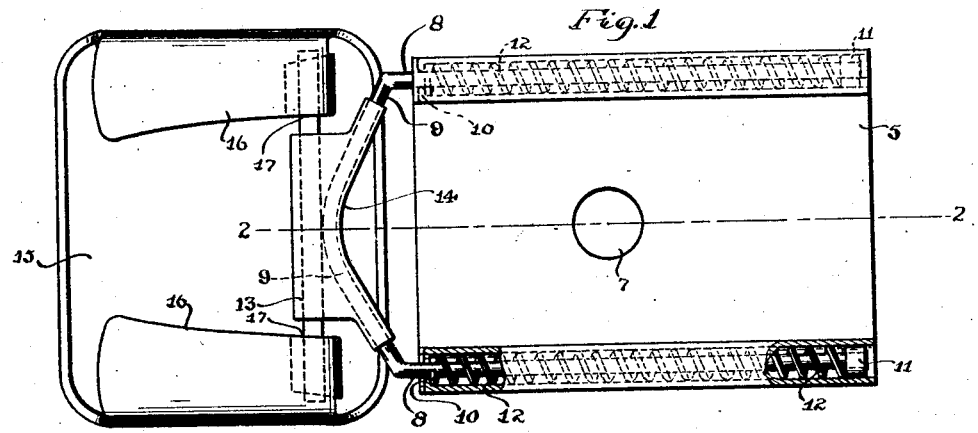
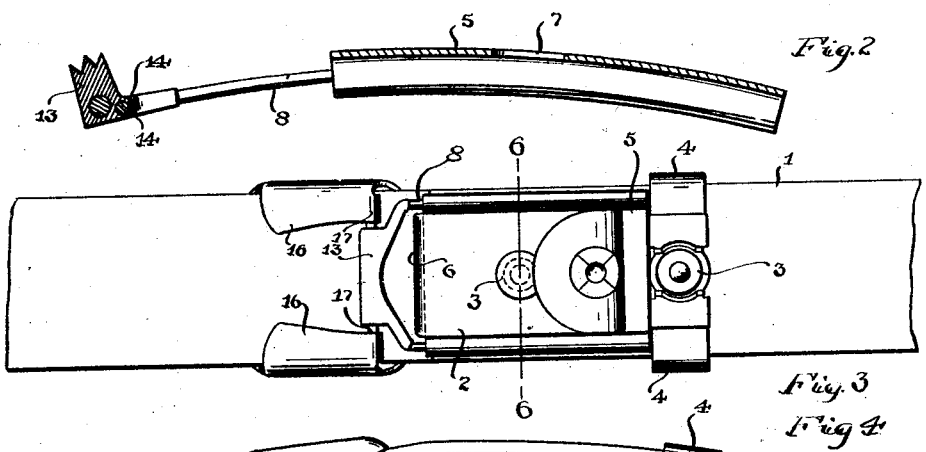
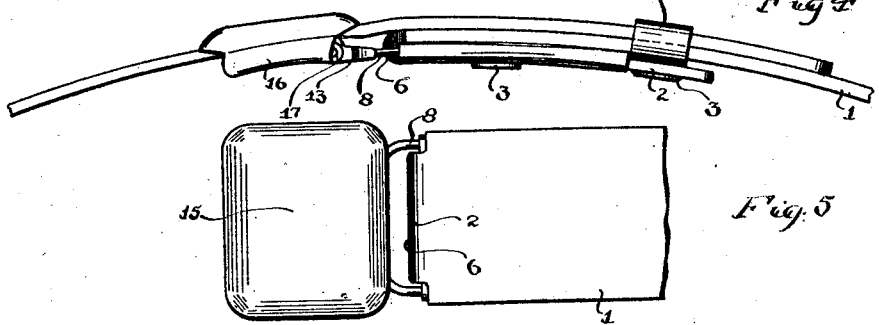
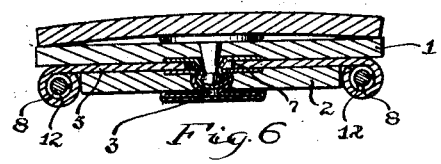
INVENTOR
Edwin S. Mix
BY
his ATTORNEY Patented Nov. 27, 1928.

1,693,093

UNITED STATES PATENT OFFICE.

EDWIN S. MIX, OF ROCHESTER, NEW YORK, ASSIGNOR TO HICKOK MANUFACTURING COMPANY, INC., OF ROCHESTER, NEW YORK.

BELT FOR PERSONAL WEAR.

Application filed September 16, 1927. Serial No. 219,899.

The present invention relates to personal wear belts and an object of the invention is to provide for mounting a spring means in rear of the front portion of the belt and beyond the side edges of a reduced inturned portion which is employed for securing the elastic connection to one end of the belt. Another object of the invention is to rigidly connect a portion of the elastic connection with a clamping member which is pivoted to a suitable frame having a clamping surface against which the other end of the belt is pressed by the clamping member.

To these and other ends, the invention consists of certain parts and combinations of parts all of which will be hereinafter described: the novel features being pointed out in the appended claims.

In the drawings:

Fig. 1 is a rear view of the elastic connection;

Fig. 2 is a vertical section on the line 2—2, Fig. 1;

Fig. 3 is a rear view of the elastic connection with the two belt ends secured thereto;

Fig. 4 is a side view of the elastic connection with the belt ends attached, the free end of the inturned portion being deflected rearwardly;

Fig. 5 is a front view of the elastic connection, with one belt end shown;

Fig. 6 is a section on the line 6—6, Fig. 3.

In the illustrated embodiment there is provided a belt 1 having one end reduced at 2 and turned inwardly on the rear face of the main or front portion of the belt. Separable fasteners 3 secure the rearwardly turned portion to the main portion while a loop 4 secured by one of the separable fasteners on the rear of the main portion of the belt extends over the front face of said main portion so that the other end of the belt may pass thereunder.

A member 5 is held between the rearwardly turned portion and the main portion of the belt and extends from the bend or fold 6 to the loop 4. One of the separable fasteners 3 passes through an opening 7 in the member 5 which, in this instance, is made of sheet metal.

Guided on the member 5 is a member comprising, in this instance, two guide bars 8 connected by a cross piece 9, all being, in this instance, formed of spring steel wire. In order to guide the bars 8 on the member 5, the latter has at opposite sides two parallel tubes or casings formed, in this instance, in one piece with the member 5 and lying at opposite sides of said member, lips 10 being formed on the member 5 and being bent to close the adjacent ends of the tubes, said lips having openings, the walls of which act as guides for the bars 8. The inner ends of the bars 8 have enlargements 11 which cooperate with the walls of the tubes to act as guides. The tubes or casings lie behind the main portion of the belt and beyond opposite edges of the reduced portion 2 so that they do not materially increase the thickness of the belt at this point and are hidden when the belt is viewed from the front.

The tubes or casings also act as enclosures for spring means opposing the movement of the two members of the elastic connection and, to this end, each casing contains a helical spring 12 which has an abutment at one end against an enlargement 11 and at the other end against a closure 10.

A novel means is employed for connecting the other end of the belt to the elastic connection so that the latter may be employed as a lever to operate a clamping member of the belt end holding means. This novel means consists, in this instance, of a pivoted clamping member 13 rigidly secured to the two guide bars. Preferably the clamping member has a curved groove in one side thereof in which the curved cross piece is received, the metal of the clamping member being turned inwardly at 14 on opposite sides of the groove to hold the cross bar in rigid connection with the clamping member.

The clamping member connects with a frame comprising preferably a front plate 15 having rearwardly and inwardly turned side flanges 16 to which the clamping member is pivoted at 17 so that said member may cooperate with the rear face of the front plate to clamp the other end of the belt.

It will be noted that both ends of the belt detachably connect with the elastic connection. One end is secured to the connection in such a manner that the spring means is inconspicuous. The other end is adjustably held by a clamping member which is rigidly connected to a part whose movement is opposed by the spring means so that the part acts as a lever for operating the clamping member. The end of the belt held by the clamping member extends over the other end of the belt so that no part of the elastic connection is visible except the front plate which may be ornamented in any suitable manner.

What I claim as my invention and desire to secure by Letters Patent is:

1. The combination with a belt having an inturned reduced end, of a member held between the main or front portion of the belt and the inturned portion, spring means arranged on said member beyond the opposite side edges of the inturned portion of the belt, a member guided on the first named member and having its movement opposed by the spring means, and means for securing the other end of the belt to said last mentioned member.

2. The combination with a belt having a reduced inturned end, of a member having a portion arranged between the inturned end and the main or front portion of the belt, two tubes on said member lying beyond the opposite edges of the inturned portion and in rear of the front or main portion, springs in said tubes, two guide bars movable in the tubes and having their movement opposed by the springs, and means carried by the guide bars for securing the other end of the belt.

3. The combination with a member to which one end of a belt is adapted to be secured, two guide bars guided on said member, spring means opposing the movement of the guide bars on the member, a clamping member rigidly secured to the two guide bars, and a frame to which the clamping member is pivoted having a surface against which the other end of the belt is held by the clamping member.

4. The combination with a belt end attaching member, of two parallel bars guided thereon, spring means opposing the movement of the bars on said member, a curved cross piece connecting the bars, a clamping member having a curved pocket in which the curved cross piece is rigidly secured, and a member to which said clamping member is pivoted having a clamping surface against which the other end of the belt is held by the clamping member.

EDWIN S. MIX.